Oct. 24, 1933.  A. O. ABBOTT, JR  1,931,638
APPARATUS FOR MANUFACTURING TIRES
Filed Jan. 12, 1929  4 Sheets-Sheet 2
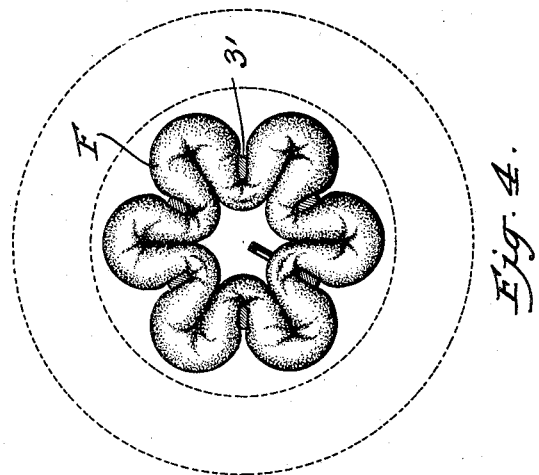
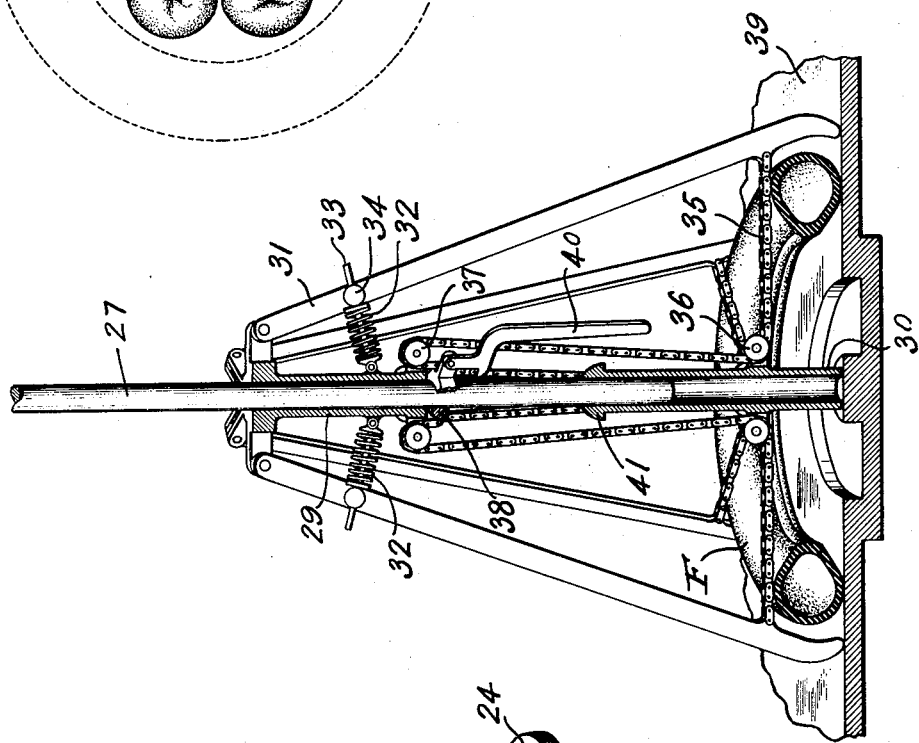
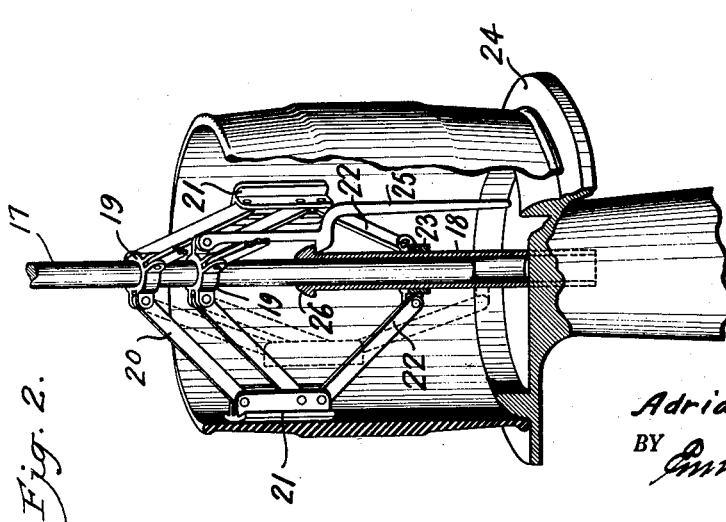
INVENTOR.
Adrian O. Abbott, Jr.
BY
ATTORNEY Patented Oct. 24, 1933

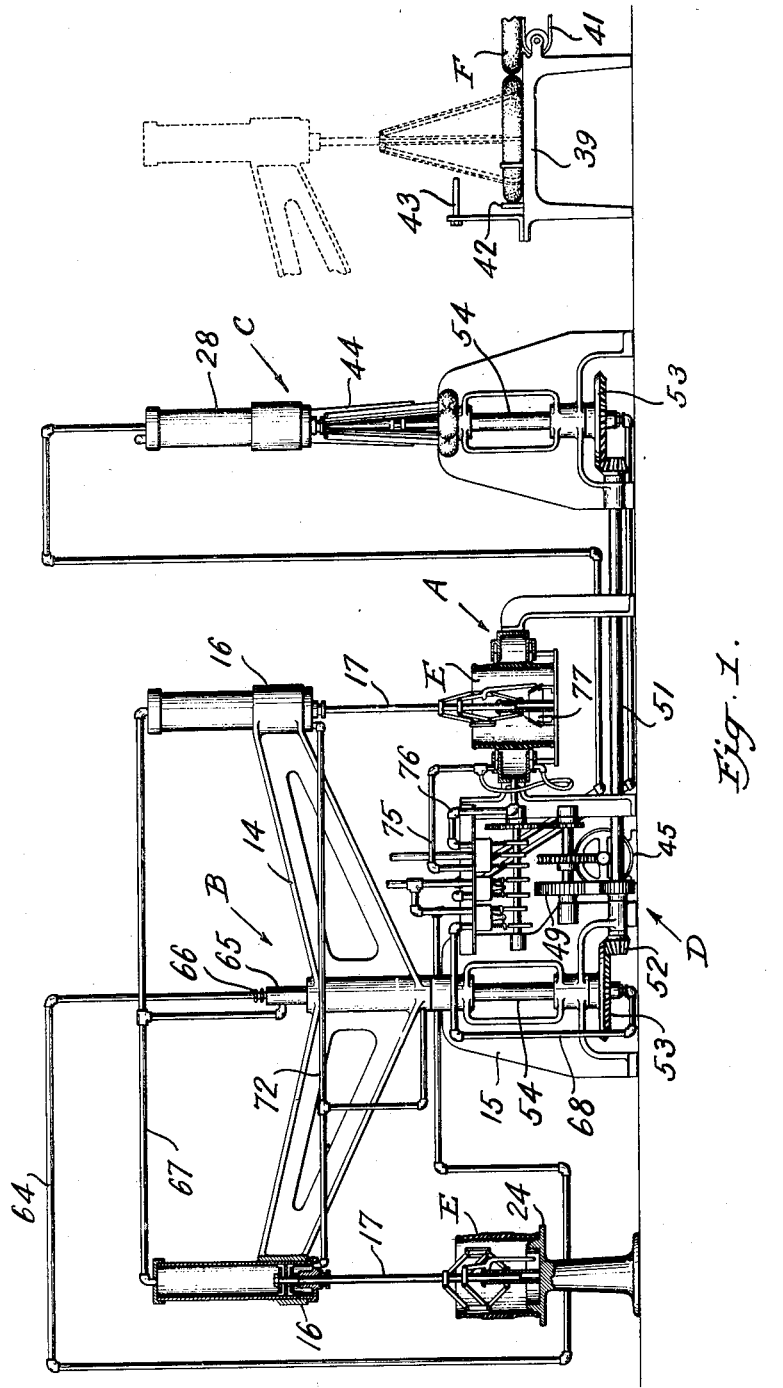

1,931,638

UNITED STATES PATENT OFFICE 1,931,638

APPARATUS FOR MANUFACTURING TIRES

Adrian O. Abbott, Jr., Detroit, Mich., assignor to Morgan and Wright, Detroit, Mich., a corporation Application January 12, 1929. Serial No. 332,204

55 Claims. (Cl. 18—2)

This invention relates to a machine for shaping pulley bands into tire casings. Preferably, this machine also inserts a curing bag into the tire casing being formed.

In the art of manufacturing tires it is customary to build the tire up upon the periphery of a drum so as to form a pulley band, flat in cross section, which may be expanded into tire shape.

In order to expand a pulley band into tire shape a device commonly known as a vacuum box is usually employed.

Heretofore it has been the practice in manufacturing tires to insert a pulley band manually into a vacuum box, to expand the pulley band into tire shape and manually to insert a curing bag in the shaped casing, and to remove the assembled tire casing and curing bag manually. This process is objectionable in that it involves a large amount of manual labor which renders the process costly and does not obtain uniform and satisfactory results.

It is the object of this invention to provide a machine whereby the pulley band and the curing bag may be assembled in the vacuum box automatically and without the use of hand labor. It is also the object of this invention to provide a machine for producing shaped tire casings more rapidly, more economically, and with more uniform results than has heretofore been possible.

Other objects of my invention will appear in the following detailed description considered in connection with the accompanying drawings, in which:

Fig. 1 is an elevation of the complete tire shaping machine.

Fig. 2 is a broken away section showing, in detail, the device for gripping a pulley band.

Fig. 3 is a detail view, partially in section, showing a device for constricting and gripping the curing bag.

Fig. 4 is a plan view of a curing bag in constricted shape.

The machine of this invention consists broadly of three units, namely the vacuum box indicated generally at A, the device for positioning pulley bands within the vacuum box indicated generally at B, and the device for positioning curing bags within the pulley band indicated generally at C. An operating mechanism for the first three devices is indicated generally at D.

Figure 5:
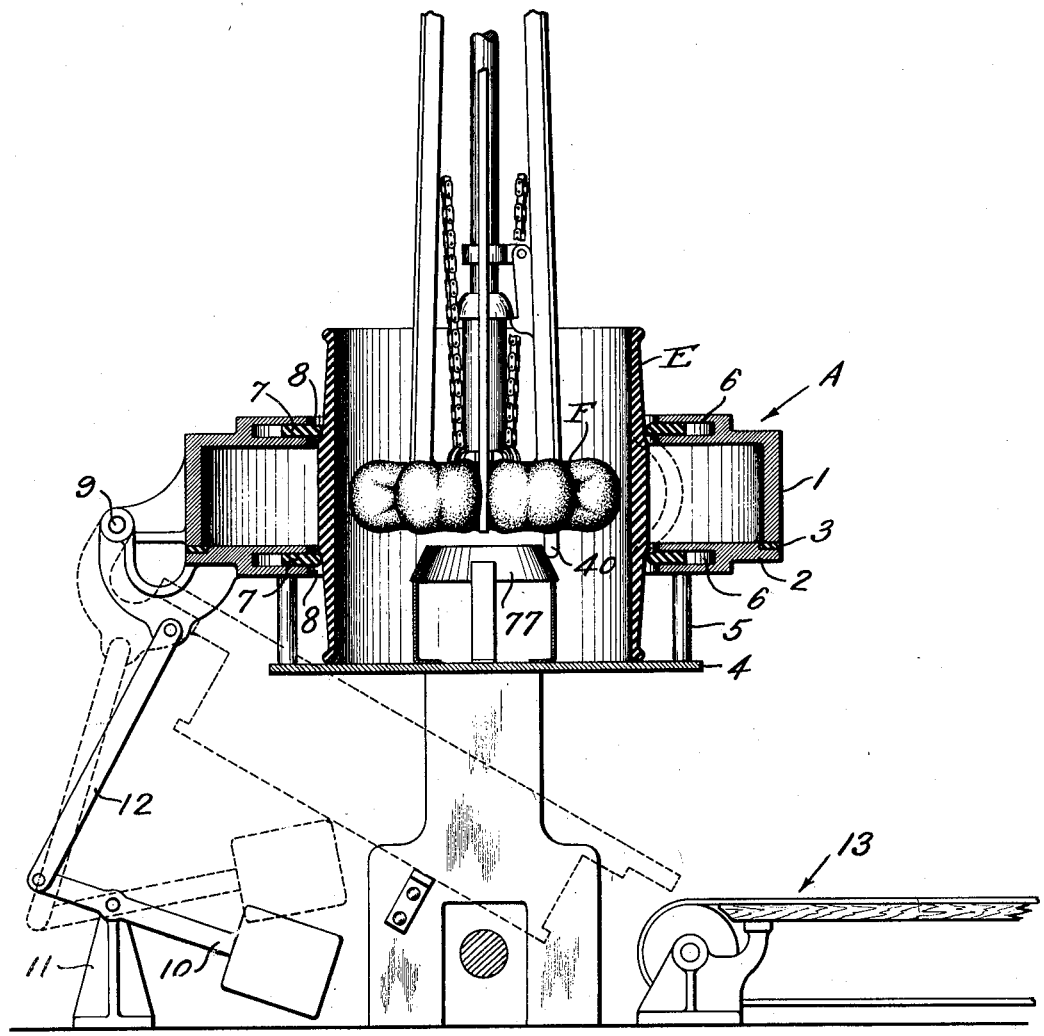
Fig. 5 is a sectional view through the vacuum box and showing the curing bag constricting device in elevation.

The vacuum box A, as shown in Fig. 5, consists of a casing 1 and a cover plate or lid 2 arranged on the lower side of the casing, there being a sealing ring 3 adapted to form an airtight seal between the casing 1 and plate 2. A platform 4 is rigidly connected with the plate 2 by suitable means such as rods 5, and in the operation of the machine the pulley band E rests upon the platform 4, as shown in Fig. 5. Annular recesses 6 are provided in the casing 1 and the plate 2 in which recesses are positioned elastic rings 7 of such size as normally to extend partially out of the recesses 6. The elastic rings 7 form an air-tight seal with the pulley band when the pulley band is positioned in the vacuum box. Apertures 8 are provided in the casing 1 and plate 2 for the reception of the pulley band.

The plate 2 is hingedly mounted upon the casing 1 as indicated at 9 and a counterweight system consisting of the weighted bar 10 pivotally mounted upon a suitable support 11 and pivotally connected to one end of the lever 12 which is pivoted at its other end on the hinge of the cover plate 2. A conveyor system 13 is positioned adjacent the vacuum box for carrying away the tire casing and curing bag at the end of the operation of the machine.

The device for positioning pulley bands within the vacuum box indicated generally at B is composed of a turret 14 rotatably carried upon a suitable support 15 and which supports, at the extremities of its arms, pneumatically operated pistons 16 which carry rods 17. As shown more particularly in Fig. 2 the rods 17 have at their lower ends, sleeves 18 slidably mounted thereon and lug rings 19 rigidly fixed thereto. Arms 20 are pivoted at one extremity on the lug rings 19 and at their other extremity arms 20 carry the shoes 21 each of which is provided with a curved face adapted to contact with the interior of pulley bands. The bars 20 are arranged to hold the faces of the shoes 21 in parallel relation with the interior of the pulley band. Radius arms 22 are pivotally connected at one extremity to the shoes 21 and their other extremities to a lug ring 23 rigidly attached to the sleeve 18. In the operation of the pulley band gripping device the rods 17 are lowered through the action of the pneumatically controlled piston 16 so that the lower end of the sleeve 18 comes in contact with the top surface of the pulley band supporting table 24 and, upon the continuation of the movement of the rod 17, the shoes 21 are thrust outwardly, due to the action of the radius rods 22, until the shoes come into contact with the inner surface of the pulley band. A latch 25 is pivotally connected with one of the lug rings 19 and is adapted to engage with the projection 26 upon the upper end of the sleeve 18 so as to lock the pulley band gripping device in expanded position (the dotted lines in Fig. 2 show the pulley band gripping device in its unexpanded position). The pulley band is then lifted from the table 24 and positioned within the vacuum box A as will be later described.

The curing bag constricting and gripping device, as more particularly shown in Fig. 3, consists of a rod 27 operated by means of a pneumatic piston 28 (see Fig. 1). Upon the lower end of the rod 27 is mounted sleeves 29 and 30. The sleeve 29 has pivoted thereon the levers 31, the distant extremities of which are adapted to engage the outer periphery of the curing bag at various points. The levers 31 are normally held in an outwardly disposed position by means of the springs 32 surrounding the guide rods 33 which are pivoted on the sleeve 29 and which slide through apertures in the lugs 34 on the levers 31. Flexible connecting means such as chains 35 are connected to the levers 31 adjacent their lower extremities and extend over pulleys 36 and 37 mounted upon sleeves 30 and 29 respectively. The other extremities of the chains 35 are connected to a collar 38 rigid upon shaft 27.

In the operation of the pulley band constricting and gripping device, the device as a whole is lowered through the action of the pneumatic piston 28 thereby bringing the ends of the levers 31 and the end of the sleeve 30 into contact with the platform 39 which supports the curing bag F. As the rod 27 continues in its downward motion it draws, through the collar 38, the chains 35 thereby moving the levers 31 radially inward with respect to the curing bag so as to constrict the curing bag into the shape shown in Fig. 4. A latch 40 is pivotally mounted on the collar 38 and engages with the head 41 on the sleeve 30 to lock the constricting device in constricting position. Provision is made, such as the circular well in the table 39, to accommodate the lower end of latch 40. The curing bag is removed from the platform 39 and inserted within the pulley band E as will be later described.

As shown at the right in Fig. 1 a conveyor 41 is provided for pushing the curing bags F on to the platform 39. Pins 42 are provided on the platform 39 for properly positioning the curing bag F and a stop 43 is also mounted upon the platform 39, the purpose of which is to so position the levers 31 of the constricting device that none of the levers will engage with the curing bag next adjacent that on the platform 39.

The curing bag constricting devices are carried upon the extremities of the arms of the turret 44 which is similar in all respects to the turret 14.

Figure 6:
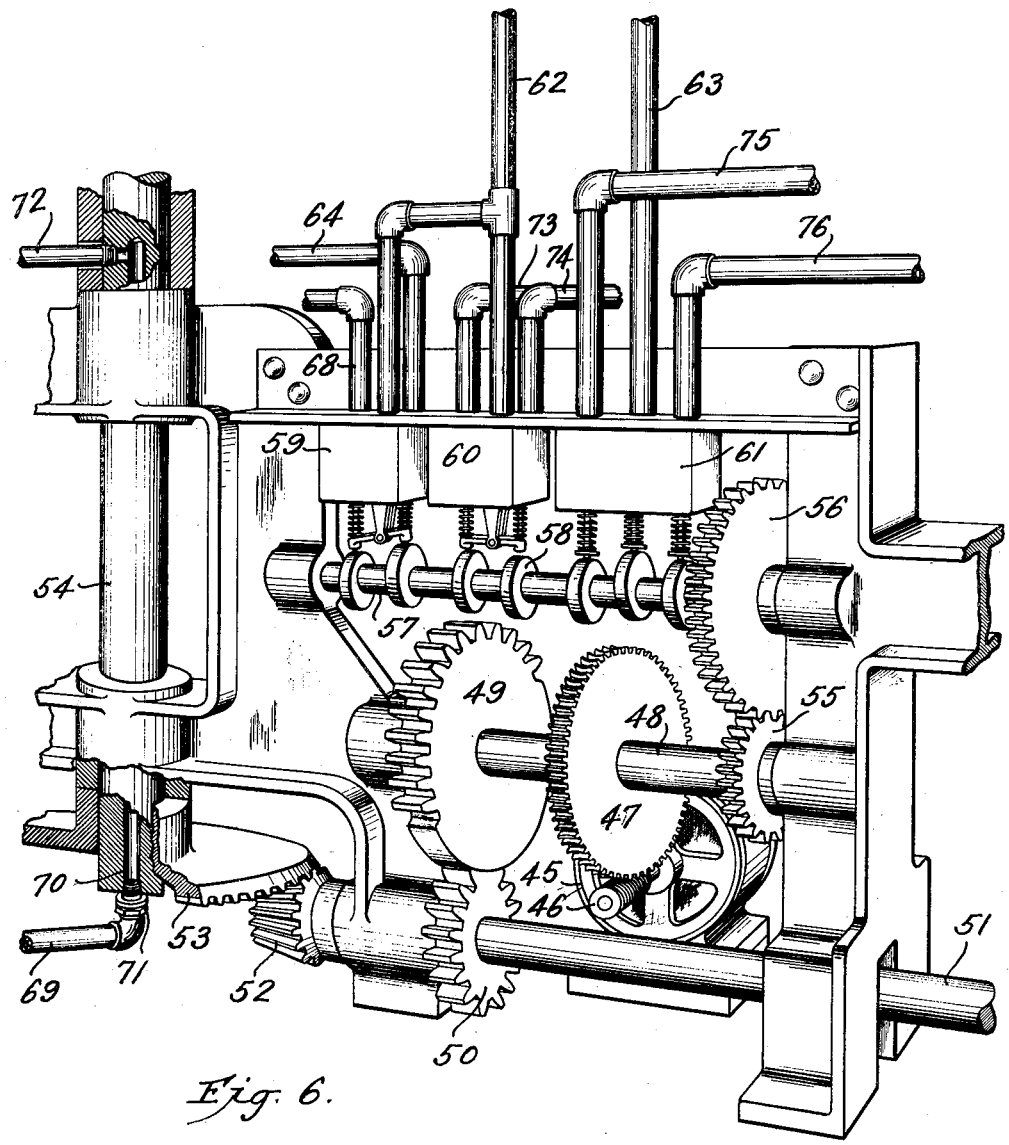
Fig. 6 is a perspective view of mechanism for operating the machine.

The operating mechanism for the machine, as shown in Fig. 6, is conveniently supported upon the base members of the pulley band inserting device B and the vacuum box A. Power is derived from the motor 45 which drives, through the worm 46 and worm wheel 47, the shaft 48. The shaft 48 is provided with an intermittent gear 49 which meshes with the gear 50 rigid upon the shaft 51. The shaft 51 carries at its extremities the bevel gears 52 which engage with and drive gears 53 which are rigidly mounted upon the shafts 54 of the turrets 14 and 44 (see Fig. 1). The gear ratios are such that the turrets are driven one-quarter of a revolution with half revolution of the shaft 48, the turrets remaining stationary during the remaining half revolution of the shaft 48 due to the action of the intermittent gear 49. The turrets 14 and 44 are mounted at right angles to one another so that the pulley band inserting device and the curing bag inserting device are brought alternately into operative relation with respect to the vacuum box A.

Spur gear 55 rigidly mounted on shaft 48 meshes with the spur gear 56 rigid upon the cam shaft 57. The various cams 58 of the cam shaft 57 operate the air valves 59, 60 and 61 conveniently mounted upon the frame of the machine. Air pressure is supplied to the valves 59 and 60 through the pipe system 62 while the valve 61 is connected with a suitable source of suction or vacuum by the pipe system 63. From the valve 59 a pipe connection 64, so arranged as not to interfere with the operation of the turret 14, extends to and is connected with the hollow tube 65 by a rotatable joint connection 66. Pressure is supplied to the tops of the piston cylinders through the pipe system 67 leading from the tube 65 and rotatable with the turret. Pipe connection 68 leads from the valve 59 into the bore 70 in the shaft 54 of turret 14. A suitable rotatable joint connection 71 is provided to allow for the turning of the shaft 70 relative to the pipe connection 69. Pressure is fed from the bore 70 through the pipe connection 72 into the lower ends of the piston cylinders. Pipe connections 73 and 74 connect the valve 60 to the cylinders of the pneumatic pistons 28 of the turret 44 in the same manner as described in connection with the turret 14. Pipe connection 75 leads from the valve 61 to the annular recesses 6 of the vacuum box A as shown in Figs. 1, 5 and 6. Pipe connection 76 leads from the valve 61 to the main chamber of the vacuum box A.

The operation of the machine follows. A pulley band E is positioned upon the table 24 in any suitable manner. The motor 45 is set into operation thereby driving the cam shaft 57 which through the cams 58 operate valve 59. The operation of valve 59 admits pressure through the pipe system 64—67 into the upper ends of the cylinders of the pneumatic pistons 16. Admission of pressure into the chambers forces the rods 17 downwardly so as to actuate the pulley band gripping device shown in Fig. 2, and to thereby grip the pulley band. Further rotation of the cam shaft 57 results in the operation of a valve 59 so as to open the pipe system 64—67 to the atmosphere and at the same time to admit air under pressure through the pipe system 68—72 into the lower ends of the cylinders of the pneumatic piston 16. The admission of pressure into the lower ends of the cylinders moves the pistons upwardly so as to lift the pulley band E from the table 24. At this time the teeth of the intermittent gear 49 mesh with those of the gear 50 thereby setting the turrets 14 and 44 into operation. The gear 49 functions to move the turrets through 90° thereby bringing the turret 14 to a position at right angles to that shown in Fig. 1 and bringing the turret 44 to the position shown in dotted lines at the right of Fig. 1. At this point the motion of the turrets temporarily ceases. Further motion of the cam shaft 57 operates the valve 60 so as to cause the lowering of the shafts 27 in the same manner as the shafts 17 of the shaft 14 were lowered. As the shaft 27 moves downwardly, see Fig. 3, the curing bag constricting and gripping device is operated in the manner above described to constrict and grip the bag, as shown in Fig. 4. Further motion of the cam shaft 57 actuate the valve 60 so as to cause the curing bag constricting device to be raised. At this point the intermittent gear 49 again meshes with the gear 50 so as to drive the turrets 14 and 44 through another 90° to thereby bring the pulley band D in a position adjacent the vacuum box A and, at the same time, to position the curing bag as shown in Fig. 1 in full lines. A further motion of the cam shaft 57 actuates the valve 59 so as to cause a lowering of the rods 17 to thereby effect the insertion of the pulley band E into the vacuum box A. As the pulley band approaches the vacuum box the cam shaft 57 operates the valve 61 so as to apply a suction in the annular recesses 6 which suction draws the elastic rings into the recesses so as to permit the insertion of the pulley band. After the pulley band has been inserted, further operation of the valve 61 opens the recesses 6 to the atmosphere so that the elastic ring 7 may contract and form a seal with the pulley band. As the pulley band gripping device is lowered into the vacuum box the end of the latch 25 engages with a conical cam 77 suitably mounted on platform A, see Figs. 1 and 5, so as to release the gripping shoes. It is to be noted that simultaneous with the insertion of the pulley band into the vacuum box, another pulley band upon the table 24 is being picked up by the pulley band gripping device on the other arm of the turret 14. Further motion of the cam shaft 57 actuates the valve 59 so as to cause the removal of the pulley band gripping device from the pulley band in the vacuum box and at the same time to cause another pulley band to be lifted from the table 24. At this point the intermittent gear 49 engages with the gear 50 so as to rotate the turrets 14 and 44 through another 90° and thereby to position the turret 14 at right angles to the position shown in Fig. 1 and to position the turret 44 as shown in dotted lines in Fig. 1. This operation brings the curing bag constricting and gripping means above the vacuum box and inserted pulley band. At this point the motion of the turrets 14 and 44 temporarily stops. Further motion of the cam shaft 57 actuates the valve 60 so as to cause the rods 27 to be lowered and thereby to insert the constricted curing bag within the pulley band, as shown in Fig. 5. The downward motion of the curing bag constricting device causes the latch 40 thereof to engage with the conical cam 77 and thereby to release the curing bag so that it may distend to its normal form and into contact with the pulley band. During the lowering of the curing bag the cam shaft 57 operates the valve 61 so as to apply a partial vacuum to the main chamber of the vacuum box A. This partial vacuum serves to expand the pulley band into a shape shown in dotted lines in Fig. 5 thereby providing an annular recess into which the curing bag fits when it is permitted to expand to its normal form. Further motion of the cam shaft 57 actuates the valve 60 so as to raise the rods 27 and withdraw the curing bag constricting device from the curing bag and pulley band. It is to be noted that as the curing bag is being inserted in the pulley band another curing bag is being picked up from the table 39 simultaneously. Further motion of the cam shaft 57 actuates the valve 61 so as to apply an increased suction in the main chamber of the vacuum box thereby expanding the pulley band into tire shape.

The counterweight system for holding the plate 2 in contact with the casing 1 acts with sufficient force to support not only the plate 2 but also a pulley band E resting upon the platform 4. However, the force of the counterweight system is not sufficient to support the plate 2, pulley band E and the curing bag F in addition. The seal between the plate 2 and the casing 1 of the vacuum box is maintained by the partial vacuum applied immediately before the insertion of the curing bag, and the more powerful suction applied to expand the pulley band into tire form further maintains the seal between the plate 2 and the casing 1 during the expanding operation. After the pulley band has been expanded into the form of a tire casing, motion of the cam shaft 57 actuates the value 61 so as to open the main chamber of the vacuum box to atmospheric pressure. Due to the fact that the counterweight system does not have a sufficient force to support the curing bag in addition to the pulley band and plate 2, this action causes the plate 2 to lower thereby opening the vacuum box so that the shaped tire casing and the curing bag therein is removed from the plate 2 by gravity, the ensemble sliding from the plate 2 onto the conveyor 13 which conducts it away.

As will be understood from the above description the machine operates automatically alternately to insert a pulley band D in a vacuum box A and a curing bag F into pulley band E, the operation of the turrets and their associated mechanism being intermittent and so synchronized as to permit of such an operation of such a machine as a whole. As pointed out immediately above the removal of the shaped tire casing and curing bag from the vacuum box A is automatic so that the machine may work automatically, it only being necessary to supply the pulley bands E to the table 24 and the curing bags F to the conveyor 41 which may be done manually or by other automatic means, if desired.

While the above description sets forth in detail a preferred embodiment of my invention, it is obvious that one skilled in the art may make many changes therein within the scope of the invention, and therefore it is intended that the invention shall not be limited otherwise than by the prior art and the scope of the following claims.

Having thus described my invention what I claim and desire to protect by Letters Patent is:

1. In a tire shaping machine, in combination, a vacuum box for expanding pulley bands into tire shape, and intermittently actuated pneumatically operated means for inserting pulley bands within the vacuum box.

2. In a tire shaping machine, in combination, a vacuum box for expanding a pulley band into tire shape, and intermittently actuated pneumatically operated means for inserting a curing bag within the pulley band.

3. In a tire shaping machine, in combination, a vacuum box for expanding a pulley band into tire shape, intermittently actuated pneumatically operated means for properly positioning a pulley band in the machine, and intermittently actuated pneumatically operated means for inserting a curing bag within the pulley band.

4. In a tire shaping machine, in combination, a vacuum box for expanding a pulley band into tire shape, means for inserting a pulley band into the vacuum box, means for inserting a curing bag into the pulley band, and means for operating the first mentioned means and the second mentioned means alternately and synchronously, so as to effect the successive insertion of the pulley band into the vacuum box and of the curing bag into the pulley band.

5. A tire shaping device having, in combination, a casing open on the lower side, a cover plate adapted to close the open side of the casing, said casing and cover plate having apertures therethrough to accommodate a pulley band, a base plate attached to the cover plate for supporting the pulley band, a cam on the base plate adapted to cooperate with a pulley band inserting means and with a curing bag inserting means.

6. A pulley band manipulating device comprising in combination, a vacuum box, means for gripping the pulley band, means for transporting and positioning the pulley band within the vacuum box, and means for releasing the pulley band.

7. A pulley band manipulating device comprising, in combination, pneumatic means for gripping the pulley band, pneumatic means for removing the pulley band from its support, means for transporting the pulley band, pneumatic means for positioning the pulley band within a vacuum box, and means for releasing the pulley band.

8. A curing bag manipulating device comprising, in combination, means for constricting the bag, means for transporting the bag while constricted and for positioning the bag within a pulley band, and means for releasing the constricted bag.

9. A curing bag manipulating device comprising, in combination, pneumatic means for constricting and gripping the bag, pneumatic means for removing the bag from a support, means for transporting the curing bag and constricting means, pneumatic means for positioning the curing bag within a pulley band, and means for releasing the constricting means.

10. A device for gripping a pulley band resting on a support comprising, in combination, a rod movable through the pulley band, a sleeve slidable on the rod, members adapted to contact with the band, arms connected with the rod and the sleeve for supporting said members, and a latch on the rod adapted to engage the sleeve.

11. A pulley band gripping device comprising, in combination, members adapted to contact with the band, means for supporting the members, means for moving the members into contact with the pulley band, and means for locking the last mentioned means.

12. A curing bag constricting device comprising, in combination, members adapted to contact with the curing bag at various points on its outer periphery, means for supporting the members, means for operating the members to constrict the bag, and means for locking the last mentioned means.

13. A curing bag constricting device comprising, in combination, a shaft movable toward the curing bag, sleeves movable on said shaft, arms mounted on one of the sleeves, and arranged to engage the bag at various points along its outer periphery, means for actuating the arms to constrict the bag upon movement of the shaft relatively to the sleeve.

14. In a tire shaping device the combination with a vacuum box for shaping a flat tire band, of gripping means for positioning an air bag in the tire band, and means for releasing an air bag against said band to assist in the shaping operation.

15. A pulley band manipulating device comprising, in combination, means for gripping a pulley band, means for transporting and positioning the pulley band, and means for releasing the pulley band.

16. A tire forming apparatus comprising means for shaping a pulley band, means for gripping and transporting a pulley band to said device, means for constricting an air bag, and means for transporting said constricted air bag and positioning it within the pulley band in said shaping device.

17. A curing bag manipulating device comprising, in combination, means for constricting and gripping the bag, means for removing the bag from a support, means for transporting the curing bag and constricting means, means for positioning the curing bag within a pulley band, and means for releasing the constricting means.

18. In a tire shaping machine, in combination, means for positioning a pulley band in the machine, means for positioning a curing bag within the pulley band and means synchronized with each of said positioning means for controlling their consecutive action.

19. In a tire shaping machine, in combination, means for expanding pulley bands into tire shape, means for inserting a pulley band into the expanding means, means for inserting a curing bag into the pulley band, and means for operating the second mentioned means and the third mentioned means alternately and synchronously, so as to effect the successive insertion of the pulley band into the expanding means and of the curing bag into the pulley band.

20. In an apparatus for manufacturing pneumatic tires, means for constricting a curing bag at spaced points about its periphery to give it a shape having the greatest dimension less than the internal diameter of the pulley band, means for inserting the constricted bag within a pulley band, means for releasing the constricting means and means for expanding the pulley band into a tire casing with the curing bag positioned therein.

21. A curing bag manipulating device comprising, in combination, means for constricting the bag, means for transporting the bag while constricted and for positioning the bag and constricting means within a pulley band, and means for releasing the constricted bag and withdrawing the constricting means from within the pulley band.

22. A pulley band gripping device comprising, in combination, a support for the pulley band, members adapted to contact with the band, supporting means for the members, means operable by engagement with the pulley band support for moving the members into contact with the pulley band, and means for locking the last mentioned means.

23. A curing bag constricting device comprising, in combination, a support for the bag, members adapted to contact with the curing bag at various points on its outer periphery, means for supporting the members, means for operating the members to constrict the bag actuated by the engagement of the said members with the said bag support, and means for locking the last mentioned means.

24. A tire forming apparatus comprising a pulley band support, a curing bag support, a tire shaping machine, means for lifting a pulley band from its support and positioning the band in the shaping machine, means for lifting a curing bag from its support and positioning the bag within the pulley band, and power means synchronized with each of said positioning means for alternating their action.

25. A tire forming apparatus comprising a pulley band support, a curing bag support, a tire shaping machine, means for lifting a pulley band from its support and lowering the band in the shaping machine, means for lifting a curing bag from its support and lowering the bag within the pulley band, and power means synchronized with each of said lowering means for alternating their action.

26. In a tire shaping machine, in combination, a vacuum box for expanding pulley bands into tire shape, and intermittently actuated means for inserting pulley bands within the vacuum box.

27. In a tire shaping machine, in combination, means for expanding pulley bands into tire shape, and intermittently actuated pneumatically operated means for inserting pulley bands within the said expanding means.

28. In a tire shaping machine, in combination, means for expanding pulley bands into tire shape, and intermittently actuated means for inserting pulley bands within the said expanding means.

29. In a tire shaping machine, in combination, means for expanding pulley bands into tire shape, intermittently actuated pneumatically operated means for inserting pulley bands within the said expanding means, and means synchronizing each of said means with each other for consecutive action.

30. In a tire shaping machine, in combination, a means for expanding pulley bands into tire shape, intermittently actuated means for inserting pulley bands within the said expanding means, and means synchronizing each of said means with each other for consecutive action.

31. In a tire shaping machine, in combination, a vacuum box for expanding pulley bands into tire shape, intermittently actuated pneumatically operated means for inserting pulley bands within the vacuum box and means synchronizing the vacuum box and pulley band inserting means with each other for consecutive action.

32. In a tree shaping machine, in combination, a vacuum box for expanding pulley bands into tire shape, and pneumatically operated means for inserting pulley bands within the vacuum box.

33. In a tire shaping machine, in combination, means for expanding pulley bands into tire shape, and pneumatically operated means for inserting pulley bands within the said expanding means.

34. In a tire shaping machine, in combination, a vacuum box for expanding pulley bands into tire shape, pneumatically operated means for inserting pulley bands within the vacuum box, and means synchronizing the vacuum box and pulley band inserting means with each other for consecutive action.

35. In a tire shaping machine, in combination, means for expanding pulley bands into tire shape, pneumatically operated means for inserting pulley bands within the said expanding means, and means synchronizing each of said means with each other for consecutive action.

36. In a tire shaping machine, in combination, means for expanding a pulley band into tire shape, intermittently actuated pneumatically operated means for inserting a curing bag within the pulley band, and continuously operating means synchronizing the vacuum box and curing bag inserting means with each other for consecutive action.

37. In a tire shaping machine, in combination, means for expanding a pulley band into tire shape, pneumatically operated means for inserting a curing bag within the pulley band, and continuously operating means synchronizing the vacuum box and curing bag inserting means with each other for consecutive action.

38. In a tire shaping machine, in combination, a vacuum box for expanding a pulley band into tire shape, intermittently actuated means for inserting a curing bag within the pulley band, and continuously operating means synchronizing the vacuum box and curing bag inserting means with each other for consecutive action.

39. In a tire shaping machine, in combination, a means for expanding a pulley band into tire shape, automatic means for inserting a curing bag within the pulley band, and continuously operating means synchronizing the vacuum box and curing bag inserting means with each other for consecutive action.

40. In a tire shaping machine, in combination, means for expanding a pulley band into tire shape, intermittently actuated pneumatically operated means for properly positioning a pulley band in the machine, and intermittently actuated pneumatically operated means for inserting a curing bag within the pulley band.

41. In a tire shaping machine, in combination, a vacuum box for expanding a pulley band into tire shape, pneumatically operated means for properly positioning a pulley band in the machine, and pneumatically operated means for inserting a curing bag within the pulley band.

42. In a tire shaping machine, in combination, means for expanding a pulley band into tire shape, pneumatically operated means for properly positioning a pulley band in the machine, and pneumatically operated means for inserting a curing bag within the pulley band.

43. In a tire shaping machine, in combination, a vacuum box for expanding a pulley band into tire shape, intermittently actuated means for properly positioning a pulley band in the machine, and intermittently actuated means for inserting a curing bag within the pulley band.

44. In a tire shaping machine, in combination, means for expanding a pulley band into tire shape, intermittently actuated means for properly positioning a pulley band in the machine, and intermittently actuated means for inserting a curing bag within the pulley band.

45. In a tire shaping machine, in combination, means for expanding a pulley band into tire shape, means for properly positioning a pulley band in the machine, and means for inserting a curing bag within the pulley band.

46. In a tire shaping machine, in combination, means for expanding a pulley band into tire shape, means for properly positioning a pulley band in the machine, means for inserting a curing bag within the pulley band, and means for discharging the assembled tire casing and curing bag from the machine by the action of gravity.

47. In a tire shaping machine, in combination, means for expanding a pulley band into tire shape, means for properly positioning a pulley band in the machine, means for inserting a curing bag within the pulley band, and means for automatically discharging the assembled tire casing and curing bag onto a conveyor.

48. In a tire shaping machine, in combination, means for expanding a pulley band into tire shape, means for properly positioning a pulley band in the machine, means for inserting a curing bag within the pulley band, and means synchronizing each of said means for consecutive action.

49. A pulley band manipulating device comprising, in combination, means for gripping a pulley band, means for removing the pulley band from its support, means for transporting the pulley band, means for positioning the pulley band within a vacuum box, and means for releasing the pulley band.

50. A pulley band manipulating device comprising, in combination, pneumatic means for gripping a pulley band, pneumatic means for removing the pulley band from its support, means for transporting the pulley band, pneumatic means for positioning the pulley band on a tire forming machine, and means for releasing the pulley band.

51. A pulley band manipulating device comprising, in combination, means for gripping a pulley band, means for removing the pulley band from its support, means for transporting the pulley band, means for positioning the pulley band on a tire forming machine and means for releasing the pulley band.

52. A pulley band manipulating device comprising, in combination, means for gripping a pulley band, and means for latching the gripping means.

53. A pulley band manipulating device comprising, in combination, means for gripping a pulley band, means for latching the gripping means, means for transporting the pulley band and gripping means and for positioning them on a shaping machine, and means for releasing the latching means.

54. A curing bag manipulating device comprising, in combination, means for constricting a curing bag, and means for latching the constricting means.

55. A curing bag manipulating device comprising, in combination, means for constricting a curing bag, means for latching the constricting means, means for transporting the curing bag and constricting means and for positioning them within a pulley band, and means for releasing the latching means.

ADRIAN O. ABBOTT, Jr.